United States Patent [19]

Yamamoto et al.

[11] Patent Number: 5,205,904

[45] Date of Patent: Apr. 27, 1993

[54] METHOD TO FABRICATE FREQUENCY DOUBLER DEVICES

[75] Inventors: Kazuhisa Yamamoto, Settsu; Kunihiko Takeshige, Hirakata; Tetsuo Taniuchi, Kobe, all of Japan

[73] Assignee: Matsushita Electric Industrial Co., Ltd., Osaka, Japan

[21] Appl. No.: 668,950

[22] Filed: Mar. 13, 1991

[51] Int. Cl.⁵ .................. H01L 21/00; G02B 6/12
[52] U.S. Cl. .................... 156/664; 65/3.14; 359/130; 359/126
[58] Field of Search .............. 156/659.1, 656, 657, 156/664; 427/85

[56] References Cited

U.S. PATENT DOCUMENTS

| | | | |
|---|---|---|---|
| 4,515,428 | 5/1985 | Findakly | 385/46 |
| 4,547,262 | 10/1985 | Spillman, Jr. et al. | 156/657 |
| 4,695,121 | 9/1987 | Mahapatra et al. | 437/173 |
| 4,778,236 | 10/1988 | Miyawaki | 385/8 |
| 4,786,131 | 11/1988 | Mahaptra et al. | 385/46 |
| 4,827,866 | 5/1989 | Maunders | 156/345 |
| 4,948,407 | 8/1990 | Bindell et al. | 156/659.1 |
| 4,953,935 | 9/1990 | Suchoski, Jr. et al. | 385/46 |
| 4,984,861 | 1/1991 | Suchoski, Jr. et al. | 437/24 |
| 5,032,220 | 7/1991 | Yamamoto et al. | 156/643 |

Primary Examiner—Brian E. Hearn
Assistant Examiner—George A. Goudreau
Attorney, Agent, or Firm—Ratner & Prestia

[57] ABSTRACT

A method to fabricate nonlinear optical frequency doubler devices comprised of a process to form periodic tantalum masks on a $LiNb_xTa_{1-x}O_3$ (wherein $0 \leq x \leq 1$) crystal substrate, a process to form periodic proton exchanged regions by applying a phosphoric acid treatment, and a process to form an optical waveguide on the surface of said crystal.

According to this fabrication method of the present invention, deeper domain-inverted regions can be formed on said crystal surface, and by this, a fundamental wave can be transformed into a harmonic wave at a high efficiency.

10 Claims, 6 Drawing Sheets

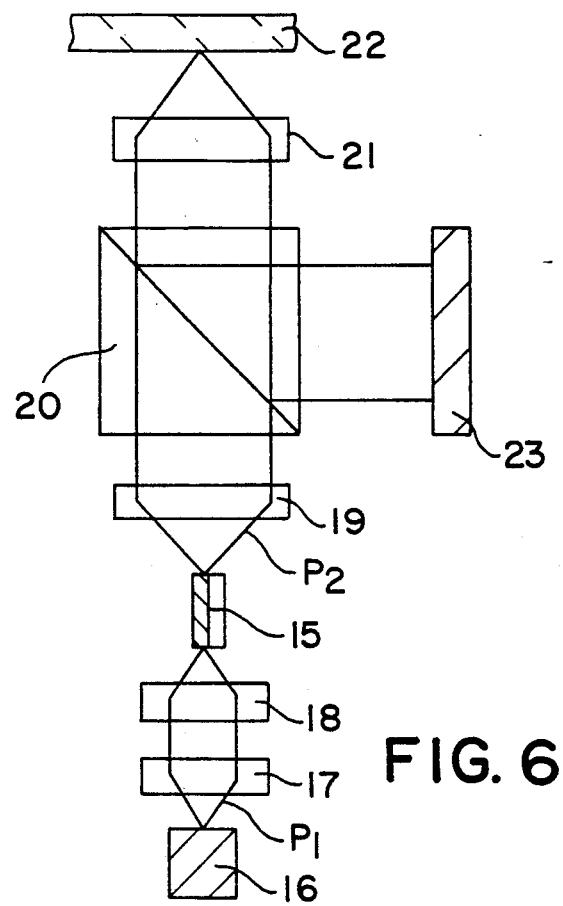
FIG. 6
FIG. 7(a)
PRIOR ART
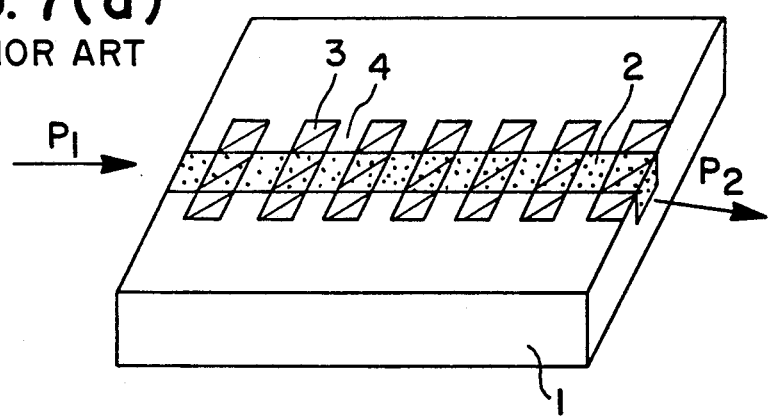
FIG. 7(b)
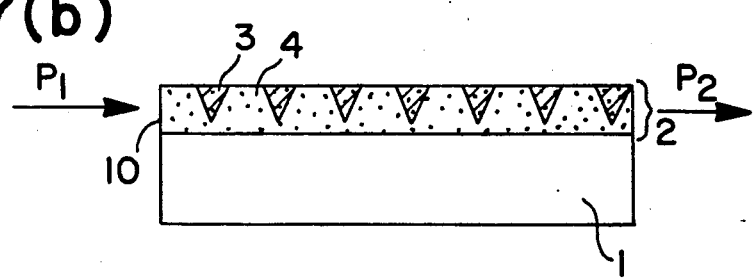

METHOD TO FABRICATE FREQUENCY DOUBLER DEVICES

BACKGROUND OF THE INVENTION

This invention is related to a method to fabricate an optical frequency doubler device which is used extensively in the field of information processing, and optical measurement and optical control utilizing the properties of coherent light.

PRIOR ART

An operating principle of a conventional frequency doubler by which higher harmonic (having a wavelength of 0.53 micron) is generated out of a fundamental wave having a wavelength of 1.06 microns disclosed by E. J. Lim, M. M. Fejer. and R. L. Byer in their report, "Second Harmonic Generation of Blue and Green Light in Periodically-Poled Planar Lithium Niobate Waveguide", reported at Topical Meeting on Nonlinear Guilded-Wave Phenomena. PD3, 1989).

A perspective view and a cross-section of a conventional optical frequency converter are shown in FIGS. 7 (a) and 7 (b) respectively, wherein 1 is a lithium-niobate ($LiNbO_3$) substrate, 2 is an optical waveguide, 3 is a domain-inverted region, and 4 is a domain-uninverted region.

As shown in FIGS. 7 (a) and 7 (b), a conventional optical frequency converter device consists of an optical guide 2, and domain-inverted and domain-uninverted regions wherein its crystal orientation is periodically inverted in a vertical direction to the optical wave guide 2 formed on a $LiNbO_3$ substrate.

When a fundamental wave P1 is incident on the input face 10 of optical waveguide 2 of an optical frequency converter device, a second higher harmonic wave P2 is output from the optical waveguide 2 at high efficiency, and this device acts as an optical frequency converter. This efficient harmonic wave generation is made possible by compensating the mismatching between propagation constants of fundamental wave and harmonic wave by means of a periodic construction of the domain inverted region 3.

Therefore, a domain-inverted construction shown in FIGS. 7 (a) and 7 (b) is one of the essential construction elements of a conventional optical frequency converter device. A fabrication method of such an optical device is illustrated in the following by referring to FIGS. 8 (a), 8 (b), and 8 (c).

First, as shown in FIG. 8 (a), the entire surface of substrate 1, a nonlinear optical crystal, $LiNbO_3$, is coated with a photoresist layer and a predetermined photoresist pattern is photolitho-graphically formed on its surface. Then, after deposition of a titanium layer on said photoresist pattern, a periodical titanium pattern 31 having a width of several microns is formed thereon by a lift-off method.

Then, by applying a heat treatment conducted at a temperature of 1100° C., domain-inverted regions 3 (wherein the domains are inverted in a direction opposite to that of the $LiNbO_3$ substrate 1) are formed under said titanium pattern 31 as shown in FIG. 8 (b).

After aluminum is deposited on the entire surface of substrate 1 and a succeeding photoresist coating, slits are formed on the aluminum layer by photolithographic means. The surface of the substrate is heat treated in benzoic acid at 200° C. for 30 minutes, and this is followed by an annealing at 350° C. to form an optical waveguide 2.

The optical frequency doubler fabricated by the above illustrated method is capable of generating a power of higher harmonic P2 of 0.5 nW when a fundamental wave P1 having a wavelength of 1.06 microns is incident on an optical guide having a length of 1 millimeter, and is capable of delivering a higher harmonic power of 800 nW for an input of 40 mW fundamental wave. In this case, the conversion efficiency per 100 mW for a 1-cm-long device, is 0.5%.

As described above, with a conventional optical frequency converter device constructed on the domain-inverted regions, the conversion efficiency is only 1/10 to 1/100 of the theoretically available value of about 50%. The reason for this can be attributed to the construction of domain-inverted regions formed under the titanium layer making an angle of 22 degrees as shown in FIG. 9.

Therefore, in attempting to form deeper domain-inverted regions, its spread in the width direction is inevitable, and therefore, is limited by the distance between neighboring domain-inverted regions.

Not only a periodic structure of domain-inverted and domain-uninverted regions but a deeper depth of optical waveguide is essential to realize a higher conversion efficiency in converting a fundamental wave into harmonic wave. Therefore, unless deeper domain-inverted regions are available, an unsatisfactory periodic structure is formed in its optical waveguide region, wherein a fundamental wave is converted into a harmonic wave, and thus, only a low conversion efficiency can be realized.

Moreover, difficulty is experienced when a heat treatment is conducted at 1100° C. which is close to the Curie temperature of $LiNbO_3$ of 1130° C. The domain of local regions where are not covered by a titanium layer contribute to invert the domain regions. Thus, by these reasons, the conversion efficiency of an optical frequency doubler had been extremely low, and its practical use had been very limited.

SUMMARY OF THE INVENTION

The present invention is a method to fabricate a high-efficiency optical frequency doubler constructed on the domain-inverted regions.

The fabrication method of this invention comprises a process to form a periodic protection mask on a nonlinear optical crystal surface, a process to form domain-inverted regions by a heat treatment after proton-exchange is conducted on the surface of said crystal, and a process to form an optical waveguide on said surface.

Semicircular domain-inverted regions having a deeper depth can be uniformly formed in the nonlinear optical crystal by employing a fabrication method of this invention. Since the domain-inverted regions can be formed at a temperature lower than the Curie temperature, the domain inversion can be locally executed on specified regions on the substrate only to form a more strictly defined periodic structure. Thus, a high efficiency optical frequency doubler can be obtained by a simple process.

BRIEF DESCRIPTION OF THE DRAWINGS

FIGS. 7 (a) and 7 (b) show constructions of a conventional optical frequency converter device.

FIG. 6 shows a construction of optical disk system employing an optical frequency doubler of the present invention.

DETAILED DESCRIPTION OF THE INVENTION

Figure 1A:
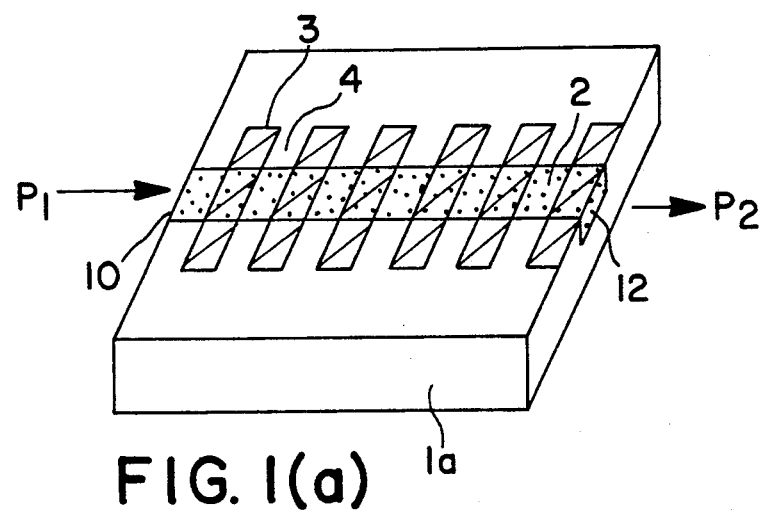
FIGS. 1 (a) and 1 (b) show constructions of an optical frequency doubler device of the present invention.
Figure 1B:
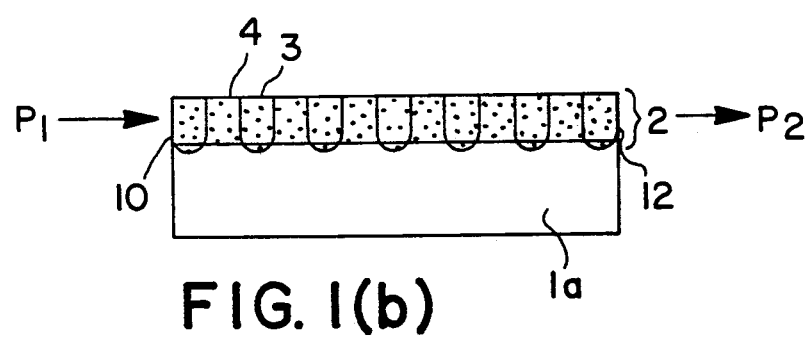
Figure 2A:
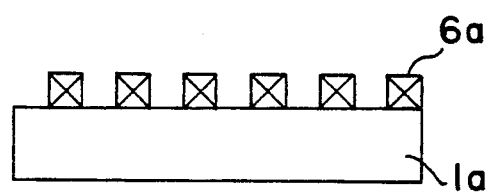
FIGS. 2 (a)-2 (d) show cross-sections of an optical frequency doubler device of the present invention in its fabrication processes.
Figure 2B:
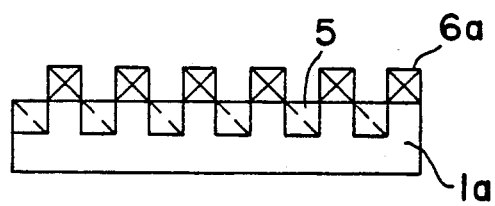
Figure 2C:
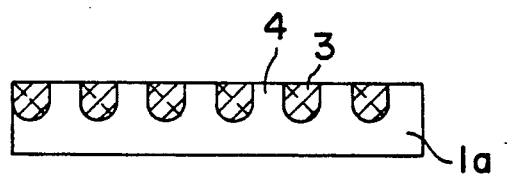
Figure 2D:
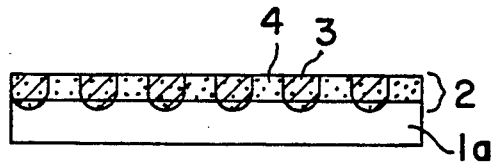

A structure of a first embodiment of an optical frequency doubler device fabricated by a process of the invention is now explained in FIG. 1 (a). FIG. 1 (a) shows a perspective view of an optical frequency doubler fabricated by a method of the present invention. FIG. 1 (a) shows a cross-section at a plane parallel to its optical waveguide.

In FIG. 1 (a), 1a is a minus-Z plane (a minus-plane of the substrate cut out vertically against the Z-axis) of a $LiTaO_3$ substrate. 2 is an optical waveguide formed on the substrate surface. 10 is an input face for a fundamental wave P1. 12 is an output face for a harmonic wave P2. 3 is a periodic domain. Inverted regions 3 and 4 are domain-uninverted regions formed on the optical waveguide.

In FIG. 1 (b), the fundamental wave P1 entered in the optical waveguide 2 is converted into the harmonic wave P2 within a domain-inverted region 3 having a length of coherent-length L. The harmonic wave power is amplified within a neighboring domain-uninverted region 4 having a same length L. By repeating these processes, the harmonic wave which gains its power in the optical waveguide 2, is radiated from the output face 12 together with the fundamental wave P1.

Here, the coherent light length is a distance which gives a maximum harmonic wave power output. It is primarily determined by the material proper refraction index and the wavelengths of fundamental and harmonic waves.

The cyclic period of domain inverted regions (sum of the distances of domain inverted and uninverted regions) is 10.7 μm, and a third order periodic structure is used. The third order periodic structure is a periodic structure wherein the respective length of domain-inverted and domain-uninverted regions is equal to three times the coherent length L, yielding L is equal to 1.78 μm in this case.

FIRST EMBODIMENT

A first embodiment of the method to fabricate an optical frequency doubler device is illustrated by referring to FIGS. 2 (a), 2 (b), 2 (c), and 2 (d).

The reason a $LiTaO_3$ nonlinear optical crystal is used in this case is that its Curie temperature of 620° C. is substantially lower than that of $LiNbO_3$. The lower Curie temperature allows the domain inversion process to be executed at a temperature substantially lower than that of $LiNbO_3$.

As shown in FIG. 2 (a), the fabrication process is started with sputter depositing of a tantalum layer which is used as a protective layer on a LiTaO3 substrate 1a for a thickness of 300A. This is transformed into a periodic pattern of tantalum masks 6a by using a dry-etching process. Then, as shown in FIG. 2 (b), a phosphoric acid process at 260° C. for 30 minutes is used to form proton exchanged regions 5 wherein lithium atoms in the substrate are substituted by proton atoms in phosphoric acid. By this process, the Curie temperature of the proton exchanged part becomes less than that of the substrate because of the locally lowered lithium density.

After the tantalum mask 6a is etched off by using hydrofluoric acid (this is not an essential process because tantalum is deposited to form an optical waveguide later), the substrate is subjected to a heat treatment at 570° C. for 5 minutes.

By this heat treatment, in which the temperature increment rate is set at 50° C./min and the temperature decrement rate is set at 30° C./min, the domain-inverted regions 3 having a depth of 2.4 microns and a periodic cycle of 10.7 microns (which is a sum of domain-inverted and domain-uninverted regions) are formed.

It should be noted that a spread of proton exchanged regions would take place and a failure of desired periodic structure formation would take place when the temperature increment rate is low in this case.

By this heat treatment, the proton exchanged regions 5 are turned into domain-inverted regions 3 having semicircular cross-sections of which their shape is a copy of the proton exchanged regions. Since the domain-inverted region takes a semicircular shape instead of a triangular shape, the depth of the domain-inverted regions is deeper than that of conventionally obtained regions.

Then, a tantalum layer is sputter deposited on the substrate, and stripe-shaped slits are formed thereon. By utilizing these slits as masks, the substrate is subjected to a proton exchange process using a phosphoric treatment which is conducted at 260° C. for 40 minutes in order to form and optical waveguide 2. This is followed by an annealing process conducted at 350° C. for 10 minutes. The thickness and width of the thus formed waveguide are 1.5 and 5 microns, respectively.

Finally, both edge surfaces vertical to the optical waveguide 2 are finished by applying an optical polish in order to provide an input face 10 and an output face 12. This completes the processes to fabricate the optical frequency doubler device shown in FIG. 1 (b). The length of the attained device is 8 mm.

When semiconductor laser light having a wavelength of 0.84 microns is introduced to this device as a fundamental wave P1 from its input face 10, a single mode propagation is produced therein, and a harmonic wave P2 having a wavelength of 0.42 micron is externally emitted from its output face 12.

Since the transmission loss in the optical waveguide 2 is 1 dB/cm (which is low), the harmonic wave P2 is produced at a high efficiency. This low transmission loss can be attributed to the uniformity of optical waveguide 2 formed by phosphoric acid. When the input power of fundamental wave is 40 milliwatts, an output power of the harmonic wave (wavelength of 0.42 micron) of 2 milliwatts is obtained yielding a conversion efficiency of 5%.

In this case, the conversion efficiency per 100 milliwatts is 12.5%. This is an improvement of approximately 20 times over that of conventional domain-inversion type optical frequency doubler device.

Since an $LiTaO_3$ substrate is used in this embodiment, no optical damage is produced, and the generation of harmonic wave is highly stable. Although pyro-phosphoric acid ($H_4P_2O_7$) is used as a phosphoric acid, the same results can be obtained with ortho-phosphoric acid ($H_3PO_4$).

Figure 3:
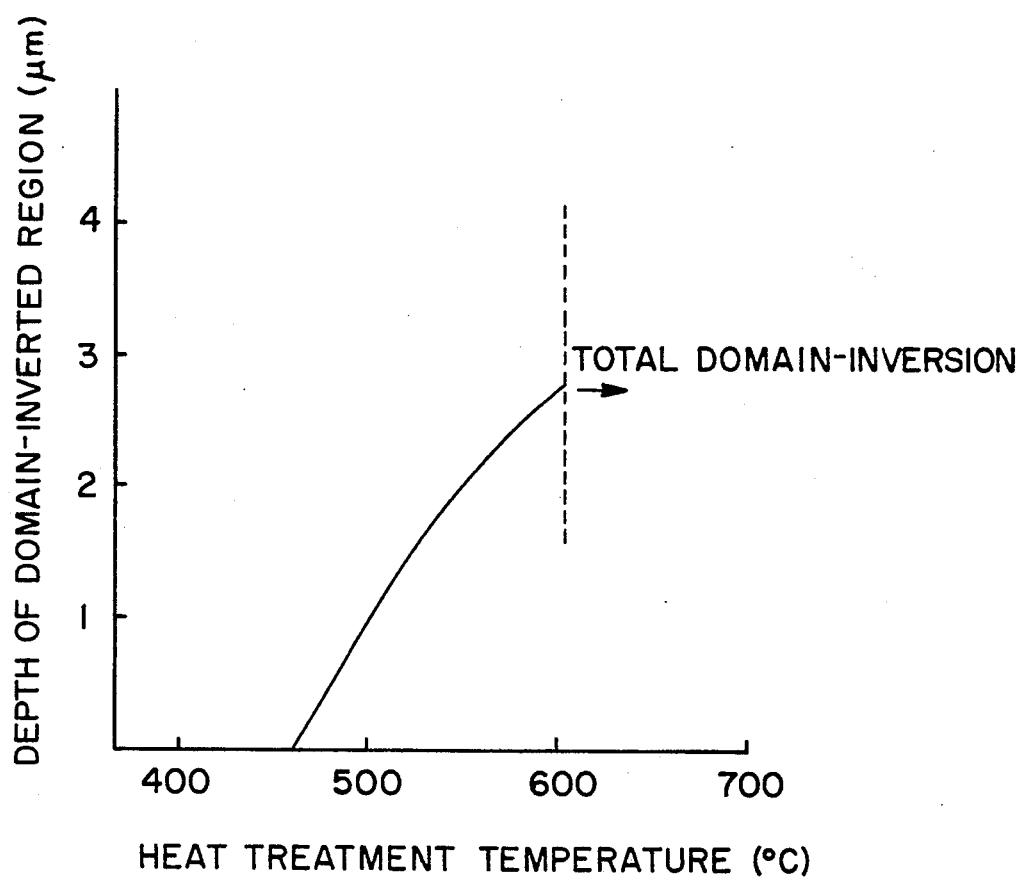
FIG. 3 shows a dependency of the depth of domain-inverted region against the heat-treatment temperature.

FIG. 3 shows a relationship between the heat treatment temperature and the depth of domain-inverted regions formed by phosphoric acid. This shows a total domain-inversion over the entire substrate when the heat treatment temperature exceeds 604° C., which is the Curie temperature of the substrate. This also shows an adequate effective depth to generate harmonic waves which cannot be obtained if the heat treatment temperature is less than 500° C. Therefore, a heat treatment temperature between 500° to 604° C. is recommended to form the domain inverted regions having an adequate effective depth.

SECOND EMBODIMENT

Figure 4A:
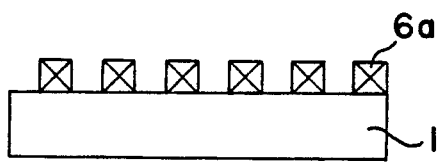
FIGS. 4 (a)-4 (c) shows cross-sections of another optical frequency doubler device of the present invention in its fabrication processes.
Figure 4B:
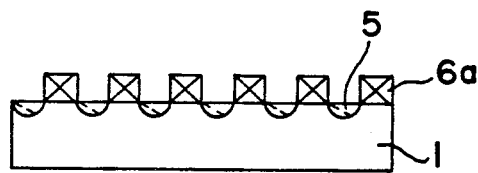
Figure 4C:
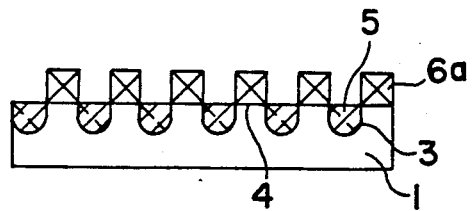

A second embodiment of the method to fabricate and optical frequency doubler device is now explained by referring to FIGS. 4 (a), 4 (b), and 4 (c). In this case, a $LiNbO_3$ substrate is used instead of a $LiTaO_3$ substrate.

As shown in FIG. 4 (a), the fabrication process is started by sputter depositing a tantalum layer which is used as a protective layer on the $LiNbO_3$ substrate 1 for a thickness of 200A. This is transformed into a periodic pattern of tantalum masks 6A by using a dryetching process. Then, as shown in FIG. 4 (b), the substrate is processed in pyrophosphoric acid at 230° C. for 4 minutes in order to form proton exchanged regions 5 at regions which are not covered by the tantalum protective pattern.

Then, the substrate is subjected to a heat treatment at 1025° C. for 10 seconds as shown in FIG. 4 (c) to form domain-inverted regions 3 having a depth of 1.4 microns. This heat treatment is conducted with a temperature increment rate of 100° C./min and a temperature decrement rate of 50° C./min. It should be noted that this temperature decrement rate should be more than 30° C./min since a decrement rate lower than this may result in nonuniform inversion.

Since the lithium atom density in the proton exchanged regions 5 is lowered, its Curie temperature becomes less than that of the unprocessed substrate by about 100C. Therefore, the proton exchange process can be executed at a substantially lower temperature.

The domain inversion of only the proton exchanged regions can be attributed to a decrease of lithium atom density in the $LiNbO_3$ substrate caused by the proton exchange. Thus the domain inversion can be produced easier than that for the domain-uninverted regions. The length L of the domain inverted region is 1.5 microns in this case.

The substrate is then subjected to a chemical etching performed by a 1 : 1 mixture of HF and $HNF_3$ for two minutes in order to remove the tantalum masks 6A.

Then, a striped-shaped tantalum mask, that is, a tantalum mask with slits having a width of 6 microns and a length of 10 mm is formed to form an optical waveguide on the crystal surface. The proton exchange process is conducted at 230° C. for two minutes. This is followed by an annealing made at 350° C. for one hour after the tantalum mask is etched off.

The refraction index of the proton exchanged regions formed under the slits of the protection mask is enhanced by an order of 0.03 forming a high-refraction index region which acts as an optical waveguide wherein the light is propagated.

The optical waveguide is thus formed by the fabrication process described above. The thickness d of the optical waveguide is 1.2 microns, and this is less than the thickness of the domain-inverted regions which is 1.4 microns. Therefore, since the light which propagates within the optical waveguide goes totally through the periodic structured layer consisting of the domain-inverted and domain-uninverted regions, the frequency conversion is executed at a high efficiency.

Figure 5:
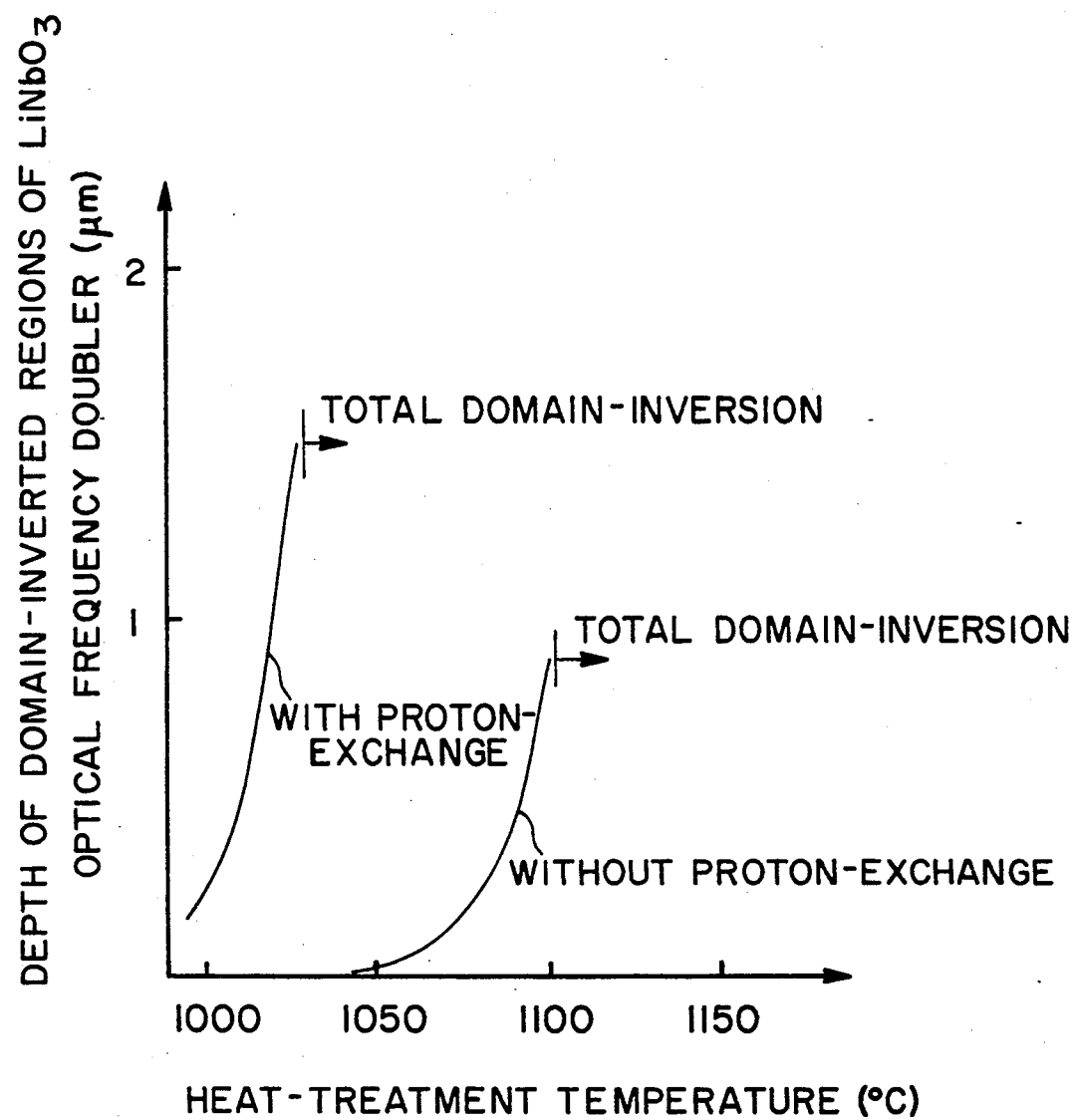
FIG. 5 shows a dependency of depth of domain-inverted regions of $LiNbO_3$ optical frequency doubler of the present invention against the heat-treatment temperatures.
Figure 8A:
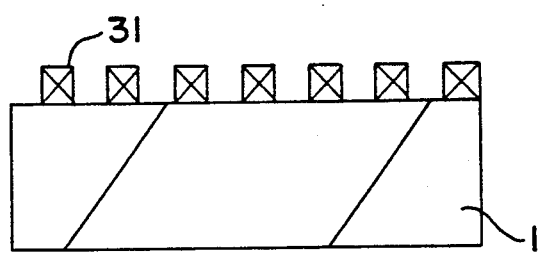
FIGS. 8 (a)-8 (c) show cross-sections of a conventional optical frequency doubler device in its fabrication processes.
Figure 8B:
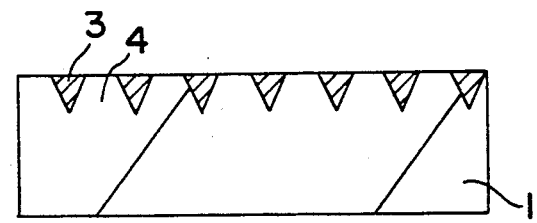
Figure 8C:
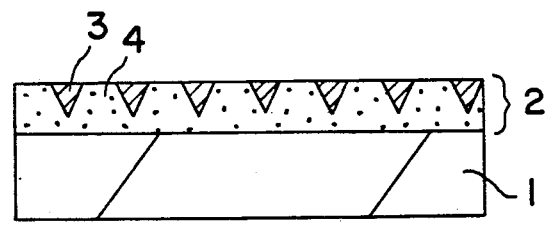
Figure 9:
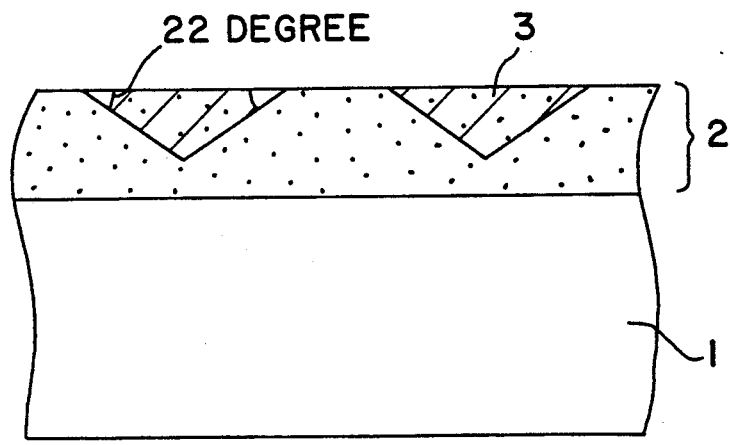
FIG. 9 shows an enlarged cross-section of a conventional optical frequency doubler device.

FIG. 5 shows a relationship between the heat-treatment temperature of the $LiNbO_3$ substrate and the thickness of the domain-inverted region. This shows that the domain-inversion is produced at a temperature lower than that of the case where no proton exchange is made by 80° C. It also shows that the depth of the domain-inverted region is twice as much of the conventional case. This is attainable at a processing temperature within a range of more than 1000° C. and less than 1040° C.

The conversion efficiency of the frequency doubler device fabricated by the process of this embodiment for an input of 40 milli-watts is 10%, and the harmonic wave generation when the fundamental wave having a wavelength within 0.65 to 1.6 microns is confirmed.

Although a tantalum mask is used to form an optical waveguide, tantalum oxide or tungsten can also be used to form a proton exchange mask.

THIRD EMBODIMENT

A third embodiment of the method to fabricate an optical frequency doubler device is now explained. The device construction is identical with that obtained by the first embodiment. However, instead of a conventional $LiNbO_3$ substrate, a substrate of $LiNbO_3$ doped with MgO is used in this case because this is more robust against damages caused by light. The heat treatment of the substrate is conducted at 1100° C. in order to form the domain-inverted regions.

The reason for the higher heat-treatment temperature is that its Curie temperature is raised by 80C by MgO doping. A proton exchanged optical waveguide which can be processed at a temperature lower than that for the formation of domain-inverted regions is employed in this case also.

The conversion efficiency of the device obtained by this fabrication process is 4% for an input of 40 milliwatts, and a highly stable output is available.

FOURTH EMBODIMENT

As a fourth embodiment of the invention, an example where an optical frequency doubler device fabricated by a fabrication method of the invention is applied to an optical disk readout is now illustrated by referring to FIG. 6. A device construction is shown in FIG. 6 where the fundamental wave P1 emitted from a semiconductor laser 16 is transformed into a parallel light by means of a collimator lens 17. This is introduced to the optical frequency doubler 15 by using a focusing lens 18.

The fundamental wave P1 is converted into the harmonic wave P2 by means of the optical frequency doubler 15. This is externally emitted out of the substrate as a light beam. After this beam is transmitted through a polarized beam splitter 20, the parallel harmonic wave P2 is focused on an optical disk 22 by using a focusing lens 21 making a spot having a diameter of 0.6 micron thereon.

After passing through the polarized beam splitter 20 again, the light reflected from the disk is then introduced into a light sensor 23. When a fundamental wave P1 having a power of 40 milliwatts obtained by a semiconductor laser 16 generating 60 milliwatts at a wavelength of 0.84 micron, is coupled to the optical frequency doubler device 15, a harmonic wave P2 generated at an emission power of 2 milliwatts is available.

By using an optical frequency doubler device of the invention, the 0.8 micron spot diameter, available from a conventional semiconductor laser light used to read out an optical disk, can be reduced by about one-half. This means and improvement of recording density by four times. Moreover, by using this harmonic wave emitted from the optical waveguide, a light spot without astigmatism can be easily obtained. Although $LiNbO_3$ or $LiTaO_3$ crystals are used as a nonlinear optical crystal in this case, ferroelectric crystals such as $KnbO_3$ can be employed as well.

As above described, according to the fabrication method of the invention, by applying a proton exchange process locally on the substrate by using a protective mask, the density of lithium in the substrate can be locally reduced, and this the local Curie temperature can be lowered and thus, periodically disposed deeper and more uniform domain-inverted regions can be produced.

Moreover, since this process can be accomplished at a temperature substantially lower than that of conventional cases, impurity diffusion can be suppressed also. A high-efficiency optical frequency device can then be fabricated by compensating since a phase irregularity was covered by utilizing such periodically disposed domain-inverted regions.

Furthermore, the harmonic wave generated by the optical frequency doubler device fabricated by the method of the present invention can be easily taken out of the optical waveguide, and thus, a spot without astigmatism can be obtained easily. Its practical application is highly valuable.

What are claimed:

1. A fabricating method of an optical frequency doubler device comprising the steps of: forming periodically disposed protection masks on a nonlinear optical crystal substrate; forming domain-inverted regions by heat treatment after applying a proton exchange process on said non-linear optical crystal substrate; and forming an optical waveguide on said nonlinear optical crystal substrate surface.

2. A fabricating method of an optical frequency doubler device according to claim 1, comprising the further steps of forming domain-inverted regions by a heat treatment after forming said optical waveguide on said nonlinear optical crystal substrate surface after removal of said protection mask.

3. A fabricating method of an optical frequency doubler device according to claim 1, comprising the further steps of forming said protection mask over the entire surface of said nonlinear optical crystal substrate; and etching said nonlinear optical crystal substrate process to form said mask into a periodic construction.

4. A fabricating method of an optical frequency doubler device according to claim 1, comprising the further step of forming both an input face to introduce a fundamental wave and an output face to emit a harmonic wave vertically on the respective end-edges of said optical waveguide prepared on said non-linear optical crystal substrate.

5. A fabricating method of an optical frequency doubler device according to claim 1, wherein the nonlinear optical crystal substrate is a substrate of $LinB_xTa_{1-x}O_3$ ($0 \leq x \leq 1$).

6. A fabricating method of an optical frequency doubler device according to claim 1, wherein said optical waveguide is formed by a proton exchange process.

7. A fabricating method of an optical frequency doubler device according to claim 1, wherein said protection mask is made of tantalum.

8. A fabricating method of an optical frequency device according to claim 1, wherein said nonlinear optical crystal substrate has a cooling rate and said cooling rate of said nonlinear optical crystal substrate after its heat treatment to form said domain-inverted regions is more than 30° C. per minute.

9. A fabricating method of an optical frequency doubler device according to claim 1, wherein the temperature of said heat treatment to form said domain-inverted region is greater than 500° C. and less than 604° C.

10. A fabricating method of an optical frequency doubler device according to claim 1, wherein phosphoric acid is used in said proton exchange process.

* * * * *